(12) United States Patent
Tanii et al.

(10) Patent No.: US 8,999,482 B2
(45) Date of Patent: Apr. 7, 2015

(54) STRUCTURE, MOLDED ARTICLE, AND METHOD FOR MANUFACTURING SAME

(75) Inventors: Ryuji Tanii, Gifu (JP); Masahiro Ukai, Gifu (JP)

(73) Assignee: Gifu Plastic Industry Co., Ltd., Gifu-Ken (JP)

(*) Notice: Subject to any disclaimer, the term of this patent is extended or adjusted under 35 U.S.C. 154(b) by 319 days.

(21) Appl. No.: 13/259,017

(22) PCT Filed: Apr. 16, 2010

(86) PCT No.: PCT/JP2010/056837
§ 371 (c)(1),
(2), (4) Date: Sep. 22, 2011

(87) PCT Pub. No.: WO2010/119946
PCT Pub. Date: Oct. 21, 2010

(65) Prior Publication Data
US 2012/0021168 A1    Jan. 26, 2012

(30) Foreign Application Priority Data

Apr. 16, 2009  (JP) ................................ 2009-100015
Apr. 16, 2009  (JP) ................................ 2009-100026

(51) Int. Cl.
| | | |
|---|---|---|
| B32B 3/12 | (2006.01) | |
| B32B 3/28 | (2006.01) | |
| B32B 27/32 | (2006.01) | |
| B32B 37/14 | (2006.01) | |
| B31D 3/02 | (2006.01) | |
| B32B 37/10 | (2006.01) | |

(52) U.S. Cl.
CPC ... *B32B 3/12* (2013.01); *B32B 3/28* (2013.01); *B32B 27/32* (2013.01); *B32B 37/146* (2013.01); *B31D 3/0292* (2013.01); *B32B 37/1018* (2013.01); *B32B 37/1027* (2013.01)

(58) Field of Classification Search
USPC .................................... 428/73, 116, 117, 593
See application file for complete search history.

(56) References Cited

U.S. PATENT DOCUMENTS

| | | | | |
|---|---|---|---|---|
| 2,484,656 A | * | 10/1949 | Sikka et al. .................... | 425/356 |
| 2,952,579 A | * | 9/1960 | Merriman ...................... | 428/118 |
| 2,980,573 A | * | 4/1961 | Clifford ......................... | 428/118 |
| 3,910,374 A | | 10/1975 | Holehouse | |
| 4,001,473 A | | 1/1977 | Cook | |
| 5,038,998 A | * | 8/1991 | Morris et al. .................. | 206/509 |

(Continued)

FOREIGN PATENT DOCUMENTS

| | | |
|---|---|---|
| FR | 2239573 | 2/1975 |
| JP | 08-127091 | 5/1996 |

(Continued)

OTHER PUBLICATIONS

PCT International Preliminary Report on Patentability issued by The International Bureau of WIPO dated Nov. 15, 2011.

*Primary Examiner* — Adam Krupicka
(74) *Attorney, Agent, or Firm* — James R. Gourley; Carstens & Cahoon, LLP

(57) ABSTRACT

A structure 1 is provided with a core layer 2 where a plurality of polygonal-cylindrical or circular-cylindrical cells S are disposed adjoiningly inside and skin layers 3, 4 that are provided on the upper and lower surfaces of the core layer 2. Communication portions 6 for communicating with adjacent cells S are formed in the core layer 2. A molded article is formed by providing a bent portion to the structure 1.

11 Claims, 8 Drawing Sheets

(56) References Cited

U.S. PATENT DOCUMENTS

| | | |
|---|---|---|
| 6,569,509 B1 | 5/2003 | Alts |
| 6,726,974 B1 | 4/2004 | Pflug et al. |
| 2009/0045009 A1 | 2/2009 | Chiou |

FOREIGN PATENT DOCUMENTS

| | | |
|---|---|---|
| JP | 2004-010129 | 1/2004 |
| JP | 2009-002575 | 1/2009 |
| WO | 2008-141688 | 11/2008 |

* cited by examiner

STRUCTURE, MOLDED ARTICLE, AND METHOD FOR MANUFACTURING SAME

FIELD OF INVENTION

The present invention relates to a structure having a plurality of cells that are formed by sectioning the inside of a structure by polygonal-cylindrical or circular-cylindrical sidewalls, a molded article formed by applying a bending process to the structure, and a manufacturing method for these.

BACKGROUND OF THE INVENTION

Conventional plate-shaped structures have been known in which a plurality of cells are disposed adjoiningly inside by sectioning a structure by polygonal-cylindrical or circular-cylindrical sidewalls. Patent Document 1, for example, describes these types of structures. The structure in Patent Document 1 is formed of a core layer made of a pair of sheets and sheet-like skin layers provided on the upper and lower surfaces of the core layer. A plurality of protruding portions is regularly placed on each sheet. Each protruding portion is formed so as to protrude from the flat portion of the sheet and has a cylindrical shape with the head portion being closed. The pair of sheets is layered on top of each other in such a state that the protruding portions face each other. The tops of the protruding portions of one sheet are joined to the flat portions of the other sheet, and the adjacent protruding portions on the two sheets are joined to each other. The structure in Patent Document 1 is sectioned to form a plurality of cells that are formed of protruding portions of the core layer and flat portions of the sheets. Each cell has an independent space that is completely sealed.

In addition, a honeycomb structure is known as an example of the above described structures. Patent Document 2, for example, describes a method for manufacturing a honeycomb structure from one sheet.

In accordance with the manufacturing method in Patent Document 2, a sheet material is molded so that a plurality of protruding portions having a predetermined shape is provided on the plastic sheet. After that, the sheet material is folded along a plurality of fold lines, and portions that make contact with each other are joined to each other so that a honeycomb structure is formed. Specifically, when one protruding portion is folded, one hollow prismatic columnar section having a plurality of cells disposed adjoiningly along the fold line is formed. As a result, a plurality of sections is disposed adjoiningly along the direction perpendicular to the fold line. Then, the adjacent sections are joined to each other to form a plate-shaped honeycomb structure.

The structures in Patent Documents 1 and 2 are not only used as a mere plate, but also used as a molded article having a three-dimensional shape after a bending process has been applied. The molded articles that are formed by applying such a bending process are used as members (for example, bottom wall portion) for forming a pallet box, as shown in FIG. 9, for example (see Patent Document 3).

PRIOR ART DOCUMENT

Patent Document

Patent Document 1: Japanese Laid-Open Patent Publication No. 8-127091
Patent Document 2: Japanese National Phase Laid-Open Patent Publication No. 2002-531287
Patent Document 3: Japanese Laid-Open Patent Publication No. 2004-010129

SUMMARY OF THE INVENTION

In general, a bending process is applied to a structure by fitting the structure into a mold when heated. Therefore, in the case where the individual cells of the structure are completely sealed, the air within the cells is thermally expanded, making the internal pressure in the cells excessively high. When the molded article is taken out from the mold in such a state, pressure from the mold is released, and therefore such a problem arises that the cells deform to an unexpected shape due to the internal pressure in the cells. In particular, the skin layers that have been further thinly extended and deformed so as to swell through the bending process. Such a deformation of cells appears as small protrusions from the surface of the molded article that is obtained by applying a bending process to the structure, and therefore reduces the quality of the molded article.

In the honeycomb structure in Patent Document 2, the adjacent sections are joined to each other through the entire surface, excluding the upper wall portion or the lower wall portion. Therefore, the molded article obtained by applying a bending process to the structure in Patent Document 2 may have a crack formed on the surface of the molded article when a portion through which the above described sections (joined surface) are joined to each other separates under bending stress during the bending process. Such a crack is a factor quality reduction of the molded article in terms of appearance and strength of the molded article.

An objective of the present invention is to provide a structure where cells are prevented from unexpectedly deforming due to an increase in the internal pressure in the cells, a molded article and a manufacturing method for these. Another objective of the present invention is to provide a molded article having excellent appearance and strength, and a manufacturing method for this.

To achieve the foregoing objective and in accordance with a first aspect of the present invention, a structure is provided that includes a core layer in which a plurality of cells are defined by polygonal-cylindrical or circular-cylindrical sidewalls so as to be disposed adjoiningly inside, and skin layers provided on the upper and lower surfaces of the core layer, wherein communication portions for connecting adjacent cells to each other are formed in the core layer.

The above described configuration allows the air in some cells having a high internal pressure to flow into other cells through communication portions, and therefore an increase in the internal pressure in the cells due to thermal extension of the air in the cells is dispersed into a plurality of cells. As a result, an excessive increase in the internal pressure in the cells is prevented, and unexpected deformation of cells due to an excessive increase in the internal pressure is prevented.

It is preferable that the core layer be provided with middle walls having a multilayer structure formed of the sidewalls of adjacent cells in which sidewalls are layered on top of each other along a direction perpendicular to the direction in which the communication portions communicate with cells, and that the communication portions be formed as a non-adhesive portion provided between layers in the middle walls.

The middle walls having a multilayer structure ensure the thickness of the middle walls because the respective layers make contact with each other in a normal state. As a result, the middle walls contribute to forming a strong cell structure. In addition, in a state where the internal pressure in the cells is increased, the middle walls in the multilayer structure provide spaces between layers as communication portions when the internal pressure presses the layers so that the layers are spaced from each other. Thus, communication portions are formed in the middle walls when the internal pressure in the cells increases, and therefore the contribution rate of the middle walls to forming a strong cell structure is increased in comparison with the configuration where the middle walls always have communication portions.

It is preferable that, between the layers in the middle walls, the non-adhesive portion be provided at the center in the thickness direction of the core layer, and adhesive portions, through which the layers are adhered to each other, are provided at the two end portions in the thickness direction of the core layer.

In the case where the internal pressure in the cells is increased, the layers in the middle walls are separated from each other from the center so as to form communication portions, while the two end portions of the core layer in the thickness direction do not separate from each other and maintain the integrated state (multilayer structure). Thus, also in the case where communication portions are formed in the middle walls when the internal pressure in the cells is increased, the multilayer structure is maintained at the two end portions of the middle wall so that a reduction in the contribution rate of the middle walls to forming a strong cell structure due to the formation of communication portions is minimized.

It is preferable that the core layer include a plurality of sheet strips formed by forming a band-shaped plastic sheet into a predetermined shape, and that the core layer be formed by adjoiningly disposing the sheet strips so that a plurality of polygonal-cylindrical or circular-cylindrical cells are disposed adjoiningly between the sheet strips.

A plurality of sheet strips can be disposed adjoiningly so that a core layer having a plurality of cells can be formed.

It is preferable that the core layer be formed by folding a sheet material molded of a single plastic sheet into a predetermined shape such that a plurality of cells that are formed by the polygonal-cylindrical or circular-cylindrical sidewalls are defined to be disposed adjoiningly in the core layer.

A core layer having a plurality of cells can be formed of one sheet.

It is preferable that the core layer be formed of a sheet material that is molded of a single sheet and has band-shaped flat surface regions and protruding regions alternately arranged in the widthwise direction. The sheet material has first protruding portions and a plurality of second protruding portions. The first protruding portions extend in the protruding regions and along the direction perpendicular to the widthwise direction and have a groove-shaped cross-section opening downwards, and the second protruding portions are formed to cross the first protruding portions, extend in the widthwise direction, and have a cross-section in polygonal or semicircular shape. The core layer is formed by valley folding the sheet material along the boundary line between the flat surface regions and the protruding regions and by mountain folding the sheet material along the boundary line between the upper surface and the side surface of the first protruding portion in the protruding regions.

A plurality of cells can be formed of groove-shaped first protruding portions and polygonal or semicircular second protruding portions.

In accordance with a second aspect of the present invention, a molded article is provided that is formed by providing a bent portion to the structure according to the first aspect through a bending process.

When a bending process is applied, unexpected deformation of the cells due to thermal extension of the air in the cells can be prevented, and a molded article with a smooth surface can be provided.

In accordance with a third embodiment, a molded article is provided that includes a structure, in which a bent portion is formed through a bending process in the structure. The structure includes a core layer and skin layers. The core layer is formed by folding a sheet material molded of a single plastic sheet into a predetermined shape so that the core layer is sectioned into a plurality of cells that are formed by the polygonal-cylindrical or circular-cylindrical sidewalls and are disposed adjoiningly inside. The skin layers are provided on the upper and lower surfaces of the core layer.

Skin layers are provided on the upper and lower surfaces of the core layer, and therefore the strength is increased in comparison with molded articles where a bent portion is formed in a structure made up of only a core layer through a bending process. In addition, in the case where a bending stress is applied during the bending process such that the joined portion in the core layer is separated, the skin layers on the upper and lower surfaces of the core layer make it difficult for the above described joined portion to be separated, and thus can prevent a crack from being formed on the surface of the molded article.

It is preferable that, in the core layer of the structure, one end surface of each cell be closed by an upper or lower wall having a two-layer structure and that the other end surface be closed by a lower or upper wall having a one-layer structure, and an opening is formed in the upper or lower wall closing one end of the cell.

In the upper and lower walls of the core layer in the structure, a portion formed of two layers (one end surface of the cells), a portion formed of one layer (the other end surface of the cells) and a portion having neither an upper or lower wall (opening) are formed in each cell. Thus, portions in one layer, two layers and three layers are formed on the upper and lower surfaces of the structure, including the skin layers, in each cell. In molded articles obtained by applying a bending process to such a structure, the portion in one layer greatly extends, allowing deformation to occur, while the portion in three layers does not allow deformation to occur and functions to maintain the structure of the cells. In addition, the portion in two layers works as a midway between the portion in one layer and the portion in three layers.

Thus, a portion that greatly allows deformation to occur and a portion that maintains the cell structure without allowing deformation to occur are provided in each cell so that the cell structure can be reliably maintained, even in a molded article where a bending process is applied to the structure. As a result, a molded article having a smoother curved surface and less unevenness can be obtained, and the strength of the molded article can be increased.

It is preferable that communication portions for connecting adjacent cells to each other be formed in the core layer of the structure.

In general, a bending process is applied to a structure by fitting the structure into a mold when heated. Therefore, in the case where the individual cells of the structure are completely sealed, the air within the cells is thermally expanded, which may excessively increase the internal pressure of the cells. When the molded article is taken out from the mold in such a state, such a problem arises that the cells deform into an unexpected shape due to the internal pressure of the cells when the pressure by the mold is released (in particular, the upper and lower wall portions that have been extended and thinned through the bending process deform by swelling).

Such deformation of the cells appear as small protrusions from the surface of the molded article which is obtained by applying a bending process to the structure, and thus reduces the quality of the molded article.

This problem does not arise in the above described configuration where the air within a cell of which the internal pressure is increased flows into other cells through communication portions, and therefore the increase in the internal pressure of the cell due to the thermal extension of the air within the cell can be dispersed into a plurality of cells. As a result, an excessive increase in the internal pressure of cells can be prevented, and an unexpected deformation of cells that would otherwise be caused by an excessive increase in the internal pressure can be prevented.

In accordance with a fourth aspect of the present invention, a manufacturing method for a molded article is provided. The method includes: a molding step for molding a single plastic sheet into single sheet material in which band-shaped flat surface regions and protruding regions are alternately arranged in the widthwise direction, the sheet material having first protruding portions and a plurality of second protruding portions, the first protruding portions extending in the protruding regions in the direction perpendicular to the widthwise direction and having a groove-shaped cross-section opening downwards, and the second protruding portions being formed so as to cross the first protruding portions, extending in the widthwise direction, and having a cross-section in polygonal or semicircular shape; a folding step for forming a core layer in which a plurality of cylindrical cells are formed upright by sectioning the core layer with the second protruding portions by valley folding the sheet material along the boundary line between the flat surface regions and the protruding regions and by mountain folding the sheet material along the boundary line between the upper surface and the side surface of the first protruding portion in the protruding regions; an opening forming step for forming an opening through a pair of overlapping portions in one end surface of each cell that is closed by the pair of overlapping portions formed of the flat surface regions and end surfaces of the second protruding portions; a joining step for forming a structure by joining skin layers to the upper and lower surfaces of the core layer; and a processing step for forming a bent portion by applying a bending process to the structure.

It is preferable that the opening forming step be a step for forming an opening by heating the core layer so that the pair of overlapping portions are thermally contracted.

In accordance with the manufacturing method for a molded article, a molded article can be easily manufactured.

In accordance with a fifth aspect of the present invention, a molded article manufactured in accordance with the manufacturing method for a molded article according to the fourth aspect is provided. It is preferable for the molded article to be manufactured in accordance with the above described method.

It is preferable that the core layer have a plurality of cylindrical cells that are formed by sectioning the core layer with the second protruding portions, that one end of each cell be closed by a pair of overlapping portions that are formed of the flat surface regions and end surfaces of the second protruding portions, that the other end be closed by upper surfaces of the first protruding portions, and that the opening be formed in a pair of overlapping portions on one end surface of the cells.

The air within some cells of which the internal pressure is increased flows into other cells through communication portions, and therefore the increase in the internal pressure of the cell due to the thermal extension of the air within the cell can be dispersed into a plurality of cells. As a result, an excessive increase in the internal pressure of cells can be prevented, and an unexpected deformation of cells that would otherwise be caused by an excessive increase in the internal pressure can be prevented.

In accordance with a sixth aspect of the present invention a structure is provided that includes a core layer and skin layers. The core layer is formed by folding a sheet material molded of a single plastic sheet into a predetermined shape, so that the core layer is sectioned into a plurality of cells that are formed by the polygonal-cylindrical or circular-cylindrical sidewalls and are disposed adjoiningly inside, and the skin layers are provided on the upper and lower surfaces of the core layer.

The strength of the core layer can be increased by the skin layers.

In accordance with a seventh aspect of the present invention, a manufacturing method for a structure is provided. The method includes: a molding step for molding a single plastic sheet into single sheet material in which band-shaped flat surface regions and protruding regions are alternately arranged in the widthwise direction, the sheet material having first protruding portions and a plurality of second protruding portions, the first protruding portions extending in the protruding regions in the direction perpendicular to the widthwise direction and having a groove-shaped cross-section opening downwards, and the second protruding portions being formed so as to cross the first protruding portions, extending in the widthwise direction, and having a cross-section in polygonal or semicircular shape; a folding step for forming a core layer in which a plurality of cylindrical cells are formed upright by sectioning the core layer with the second protruding portions by valley folding the sheet material along the boundary line between the flat surface regions and the protruding regions and by mountain folding the sheet material along the boundary line between the upper surface and the side surface of the first protruding portion in the protruding regions; a opening forming step for forming an opening through a pair of overlapping portions in one end surface of each cell that is closed by the pair of overlapping portions formed of the flat surface regions and end surfaces of the second protruding portions; and a joining step for forming a structure by joining skin layers to the upper and lower surfaces of the core layer.

A structure can be manufactured so as to have a core layer of which the strength is increased by the skin layers.

According to the structure, the molded article and the manufacturing method for these in the present invention, unexpected deformation of cells due to an increase in the internal pressure of cells can be prevented, and the appearance and the strength of the structure and the molded article can be enhanced.

DETAILED DESCRIPTION OF THE PREFERRED EMBODIMENTS

First Embodiment

A structure 1 according to a first embodiment of the present invention and a molded article having the structure are described below in reference to FIGS. 1(a) to 2(c).

As shown in FIG. 1(a), the structure 1 according to the present embodiment is formed of a core layer 2 having a honeycomb structure where hexagonal-cylindrical cell walls are disposed adjoiningly in a matrix and sheet-like skin layers 3 and 4 which are joined to the upper and lower surfaces of the core layer 2.

Figure 2A:
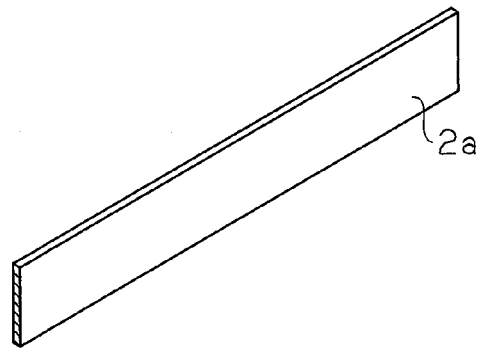
FIGS. 2(a) to 2(c) are diagrams illustrating a manufacturing method for the core layer in the structure according to the first embodiment.
Figure 2B:
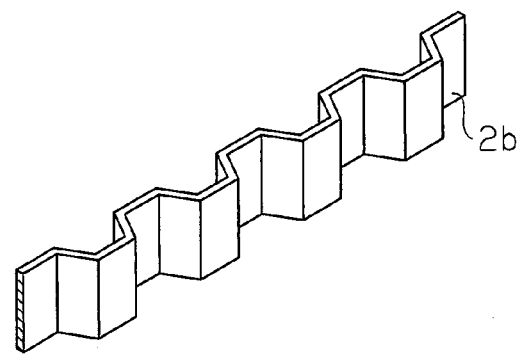
Figure 2C:
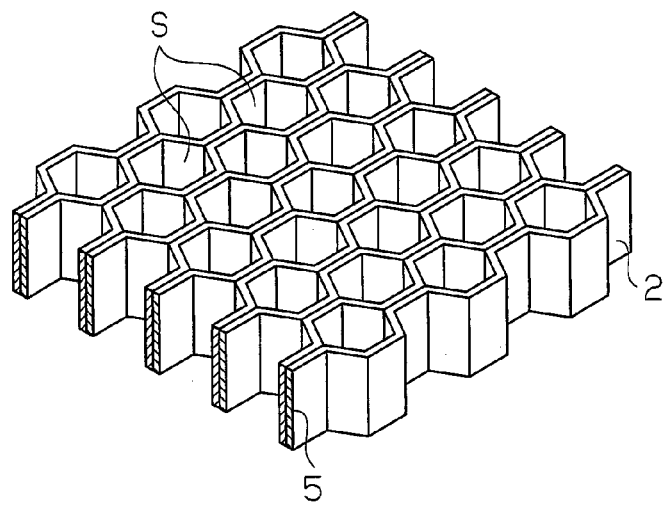
Figure 3A:
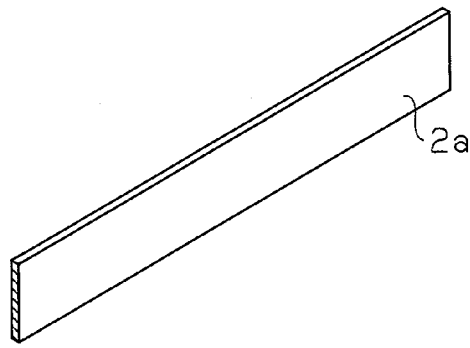
FIGS. 3(a), 3(b) and 3(d) are diagrams illustrating a manufacturing method for the core layer in the structure according to the second embodiment.
Figure 3B:
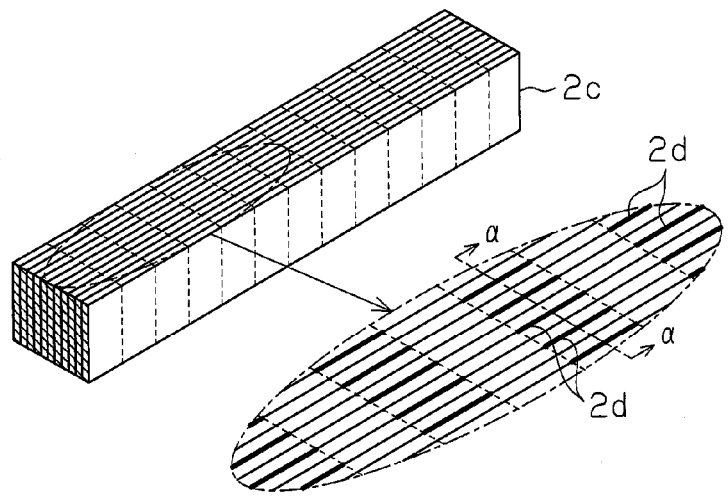
Figure 3C:
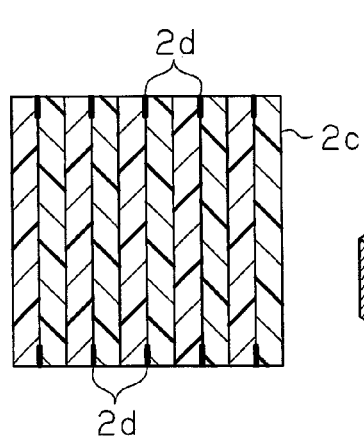
FIG. 3(c) is a cross-sectional view taken along line α-α in FIG. 3(b)
Figure 3D:
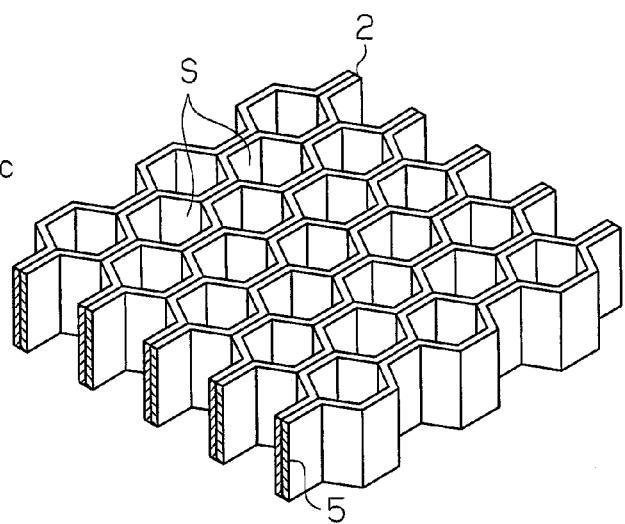

As shown in FIGS. 2(a) to 2(c), the core layer 2 is formed by disposing a plurality of bent sheets 2b to adjoin each other. The bent sheets 2b are formed by bending a band sheet 2a made of a thermoplastic resin, such as polypropylene, at predetermined intervals. Specifically, the bent sheets 2b are formed in a waveform having continuous trapezoidal undulations. The units of the trapezoidal undulations have a form that can be obtained by sectioning a regular hexagon into two along the longest diagonal line. These bent sheets 2b can be molded of band sheets 2a in accordance with a known molding method, such as a vacuum molding method or a compression molding method. A plurality of bent sheets 2b is disposed adjoiningly in such a manner that the outer surfaces of the tops and the bottoms of the undulations of the bent sheets 2b make contact with each other. Furthermore, an adjacent pair of bent sheets 2b forms hexagonal-cylindrical sidewalls, and cells S are formed by sectioning the sidewalls. In the present embodiment, the bent sheets 2b form the sidewalls of the cells S.

Sheet-like skin layers made of a thermoplastic resin, such as polypropylene, are joined to the upper and lower ends of the thus-formed core layer 2 through thermal fusion, and thus the structure 1 is formed. At this time, the cells S provided in the core layer 2 are closed by the skin layers 3 and 4 in the two end potions in the thickness direction of the core layer 2.

It is preferable for the sheet for forming the skin layers 3 and 4 to be made of the same material as of the bent sheets 2b for forming the core layer 2 from the viewpoint of the ease in joining the core layer 2 to the skin layers 3 and 4 through thermal fusion. In addition, the bent sheets 2b for forming the core layer 2 are joined to the skin layers 3 and 4 at the ends of the bent sheets 2b, while adjacent bent sheets 2b merely make contact with each other and can be separated from each other in the structure.

As shown in FIG. 1(a), in the structure 1, middle walls 5 having a two-layer structure formed of sidewalls of the two adjacent cells S, which are layered on top of each other, are located between cells S, which are adjacent to each other in the X direction. That is to say, the top and bottom of bent sheets 2b that are disposed adjoiningly make contact with each other through outer surfaces to provide contact portions, which are middle walls 5 having a two-layer structure. In addition, the middle walls 5 are formed so as to be perpendicular to the skin layers 3 and 4, and therefore provide a structure that is strong against force in the thickness direction of the structure 1, and thus the compressive strength is increased. Furthermore, the middle walls 5 are formed so as to have a two-layer structure, and thus the compressive strength of the structure 1 is further increased.

As described above, the bent sheets 2b are not joined to each other, and the middle walls 5 are formed in such a manner that the layers can be separated from each other. Therefore, as shown in FIG. 1(b), the layers in the middle walls 5 are separated from each other by the internal pressure of the cells S so that a space can be formed between the layers to provide a communication portion 6 in the case where the internal pressure is increased. This communication portion 6 connects adjacent cells S to each other in the Y direction. In the present embodiment, the entire area between the layers in the middle walls 5 is a non-adhesive portion.

Figure 8:
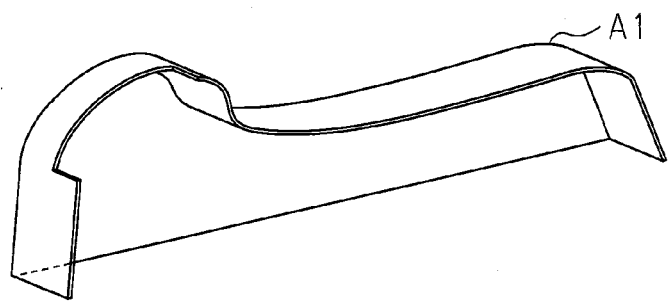
FIG. 8 is a perspective view showing a side cover of a vehicle seat, which is an example of a molded article.
Figure 9:
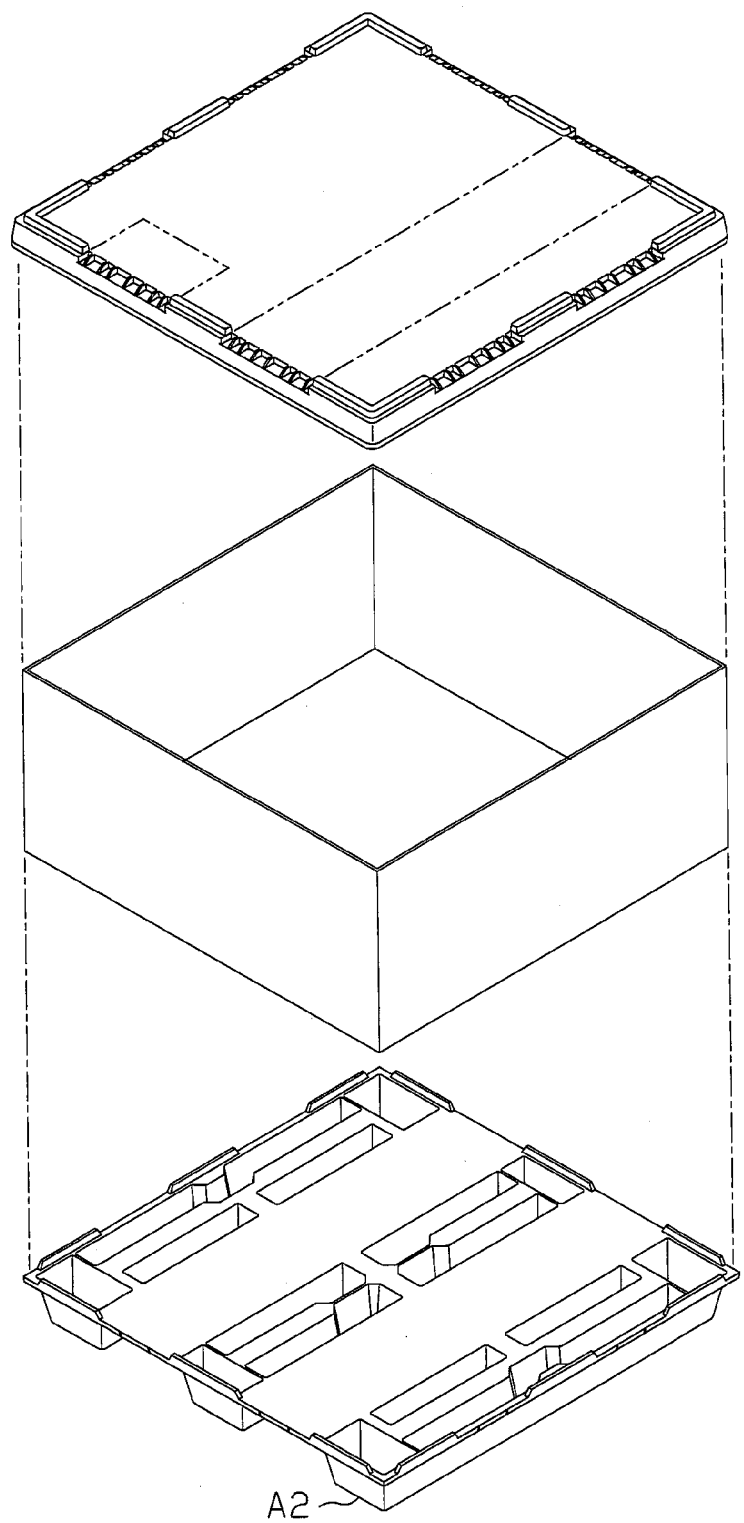
FIG. 9 is a perspective view showing a pallet box, which is an example of a molded article.

In addition, the structure 1 according to the present embodiment undergoes a processing step for forming a bent portion by applying a bending process so as to be converted to a molded article having a three-dimensional shape. Examples of such a molded article are a side cover A1 of a vehicle's seat as shown in FIG. 8 and members A2 (for example, the bottom wall portion) for forming a pallet box for carrying articles as shown in FIG. 9. Bent portions are defined as including any portion in non-plane shape (for example, a protrusion, a recess and a curved portion) that is formed in at least part of a region in the structure 1.

In the above described processing step, a heat treatment is applied to the structure 1, which is then softened, and a bending process, such as a pressing process, is applied so that a bent portion is formed. As a result, a molded article is obtained. The temperature for heating during the processing step is set to the temperature at which the seat for forming the core layer 2 and the skin layers 3 and 4 is softened so that the structure 1 is softened, and thus a bending process can be applied in such a state that the core layer 2 is connected to the skin layers 3 and 4 through fusion. As a result, the core layer 2 and the skin layers 3 and 4 can be prevented from separating from each other or cracking in the joined portion during the bending process.

In addition, the internal pressure of the cells S in the molded article is increased due to the preheating for the heat treatment during the processing step. At this time, the layers in the middle walls 5 having a two-layer structure are separated from each other due to the internal pressure of the cells S so that a communication portion 6 is formed between the layers. In addition, the internal pressure of the cells S is dispersed to other adjacent cells S across the middle walls 5 through communication portions 6.

In the present embodiment, the bent sheets 2b for forming the core layer 2 are formed of a thermoplastic resin. Therefore, the resin contracts when cooled after the bending process, and thus the layers in the middle walls 5 that are separated from each other may return to their original state where the layers make contact with each other (two-layer structure). In many cases, the middle walls 5 dispersed to the left and right due to the force during the bending process or the internal pressure of the cells S. The middle walls 5 therefore have no directionality in the vertical direction, and thus do not allow the strength in the upper and lower directions to be reduced.

The following advantages can be obtained in the present embodiment.

(1) The structure 1 according to the present embodiment is provided with a core layer 2 having a plurality of cells S disposed adjoiningly inside and skin layers 3 and 4 provided on the upper and lower surfaces of the core layer 2. The core layer 2 is sectioned to form cells S by hexagonal-cylindrical sidewalls. In addition, communication portions 6, which connect cells S that are adjacent to each other in the Y direction, are provided in the core layer 2. In the above described configuration, when the air within the cells S thermally expands to increase the internal pressure of the cells S, the air in these cells S flows into other cells S through communication portions 6. Thus, the air within some cells S of which the internal pressure is increased is dispersed into other cells S so that an excessive increase in the internal pressure of cells S can be prevented. In addition, unexpected deformation of cells S due to an excessive increase in the internal pressure can be prevented.

(2) The core layer 2 in the structure 1 according to the present embodiment is provided with middle walls 5 having a two-layer structure that are formed of sidewalls of cells S, which are layered on top of each other, when the cells S are adjacent to each other in the direction (X direction) perpendicular to the direction in which the communication portions 6 communicate with the cells (Y direction). In addition, the communication portions 6 are formed as non-adhesive portions provided between the layers in the middle walls 5. In the above described configuration, the middle walls 5 having a two-layer structure contribute to forming a firm cell structure where the layers make contact with each other in a normal state so as to secure the thickness of a wall having a two-layer structure. In addition, the layers of middle walls 5 having a two-layer structure are separated from each other due to the internal pressure of cells S when the internal pressure is increased, and therefore communication portions 6 are formed between the layers. Thus, communication portions 6 are formed in the middle walls 5 when the internal pressure of the cells S is increased, and therefore the contribution rate of the middle walls 5 to forming a strong cell structure is increased in comparison with the configuration where the middle walls 5 always have communication portions 6.

In addition, in the above described configuration, the layers of the middle walls 5 can be separated from each other when an excessive compressing force is applied in the thickness direction. The middle walls 5 of which the layers have been separated from each other tend to return to their original state due to the properties of the resin as the above described force is decreased. The middle walls 5 can allow for deformation in response to the force that is applied in the thickness direction of the structure, and therefore the structure 1 has excellent shock absorbing properties (cushioning properties) for the above described force. That is to say, the middle walls 5 can function as shock absorbing portions.

(3) In molded articles where a bent portion is formed by applying a bending process to the structure 1 according to the present embodiment, an excessive increase in the internal pressure of cells S can be prevented, and thus unexpected deformation of cells S can be prevented when a bending process is applied. Accordingly, generation of protrusions from the surface of the molded article due to the deformation of cells S can be prevented, and thus the molded article has a smoother surface.

Second Embodiment

Next, a structure 1 according to a second embodiment and molded articles of the structure will be described in reference to FIGS. 1(*a*) to 3(*d*), mainly focusing on the differences between the first and second embodiments. The structure 1 according to the second embodiment is different from the structure according to the first embodiment mainly in the structure of the core layer 2.

The core layer 2 of the structure 1 according to the present embodiment is formed as follows. First, a plurality of band sheets 2*a* as shown in FIG. 3(*a*) is layered on top of each other in the thickness direction. In addition, adhesive portions 2*d* through which adjacent band sheets 2*a* are adhered to each other are provided at constant intervals in the longitudinal direction of the band sheets 2*a* so that a laminated body 2*c* is formed (see FIG. 3(*b*)). At this time, the adhesive portions 2*d* are provided between band sheets 2*a* only in the end portions in the latitudinal direction of the band sheets 2*a* (see FIG. 3(*c*)). Next, the laminated body 2*c* is extended in the laminating direction so that a core layer 2 having a honeycomb structure where cylinder portions having a hexagonal-cylindrical section are disposed adjoiningly in a matrix as shown in FIG. 3(*d*) is formed. The core layer 2 is sectioned to form cells S by the hexagonal-cylindrical sidewalls, and the band sheets 2*a* respectively form sidewalls of the cells S.

Sheet-like skin layers 3 and 4 are joined to the upper and lower ends of the thus-formed core layer 2 through thermal fusion so that the structure 1 is formed. As shown in FIG. 3(*d*), two band sheets 2*a* make contact with each other with adhesive portions 2*d* joining the band sheets 2*a* so as to provide middle walls 5 having a two-layer structure in the present embodiment.

As described above, adhesive portions 2*d* are formed only in the two end portions of the band sheets 2*a* in the latitudinal direction, that is to say, in the thickness direction of the core layer 2 (in the laminating direction of the core layer 2 and the skin layers 3 and 4), and therefore the layers of the middle walls 5 merely make contact with each other in the center portions and can be separated from each other in the structure. Accordingly, as shown in FIG. 1(*c*), the layers of the middle walls 5 are separated from each other in the center portion due to the internal pressure of cells S so that a communication portion 6 is formed between the layers with the two end portions in the thickness direction of the core layer 2 being joined (two-layer structure) when the internal pressure is increased. In the present embodiment, the center portions between the layers of the middle walls 5 are non-adhesive portions.

The structure 1 according to the present embodiment can also undergo the above described processing step so as to provide a molded article in the same manner as the structure according to the first embodiment.

The above described advantages (1) to (3) can be obtained in the second embodiment. In addition, the following advantage can also be obtained in the second embodiment.

(4) Non-adhesive portions are provided in the center portions, and adhesive portions 2*d* are provided at the end portions in the thickness direction of the core layer 2 between the layers of the middle walls 5 in the structure 1 according to the present embodiment. In the above described configuration, the layers of the middle walls 5 are separated from each other in the center portions to provide a communication portion 6 when the internal pressure of cells S is increased while the layers are not separated from each other in the end portions, where the layers remain joined together. Thus, portions having a two-layer structure remain in the two end portions of the middle walls 5 even in the case where communication portions 6 are formed in the middle walls 5 when the internal pressure of cells S is increased, and thus a reduction in the contribution rate of the middle walls 5 to forming a strong cell structure due to the formation of communication portions 6 can be minimized.

Third Embodiment

Next, a structure 10 according to a third embodiment and a molded article A are described in reference to FIGS. 4(a) to 7 mainly focusing on the differences between the first and third embodiments. The structure 10 according to the third embodiment is different from the structure according to the first embodiment mainly in the structure of the core layer 2.

Figure 4A:
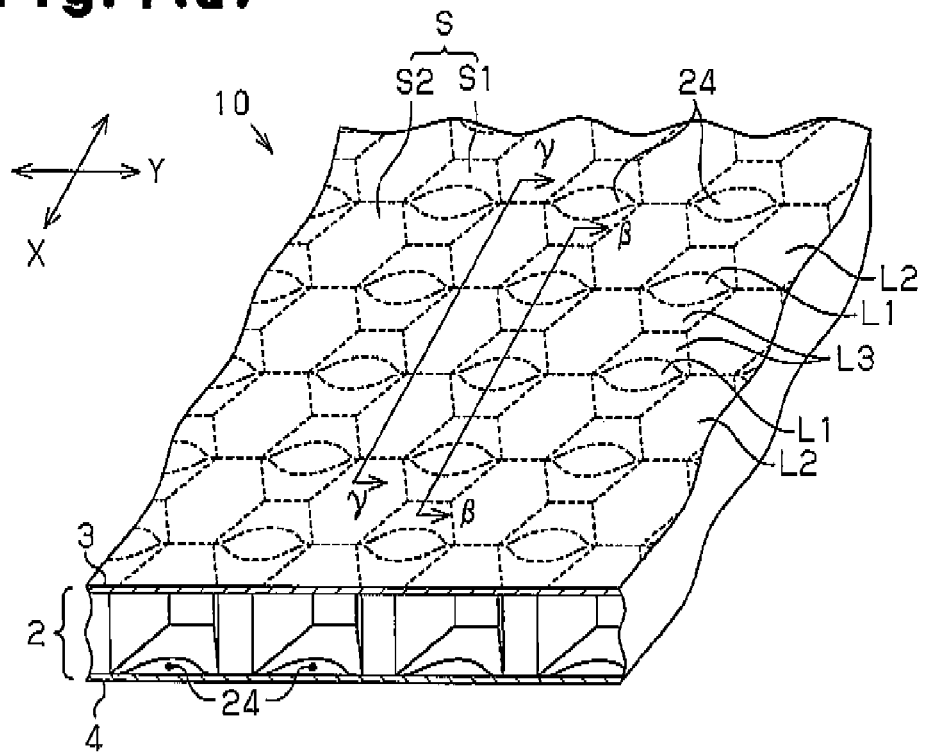
FIG. 4(a) is a perspective view showing a structure according to a third embodiment.
Figure 4B:
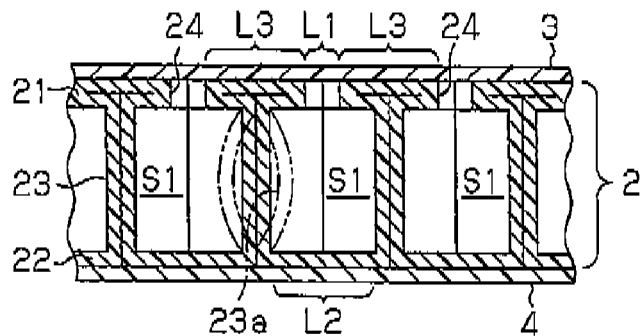
FIG. 4(b) is a cross-sectional view taken along line β-β in FIG. 4(a)
Figure 4C:
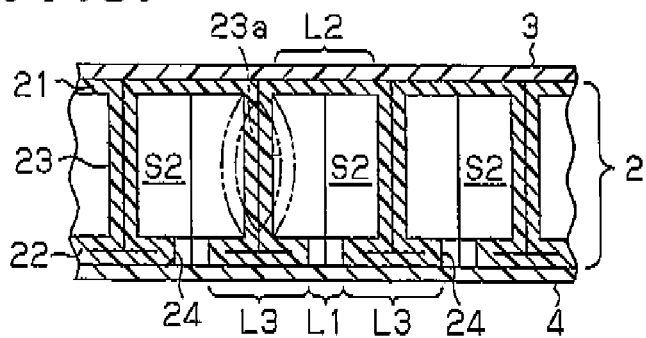
FIG. 4(c) is a cross-sectional view taken along line γ-γ in FIG. 4(a)

As shown in FIGS. 4(b) and 4(c), the core layer 2 is formed by folding one sheet material that has been formed by molding a thermoplastic resin sheet, such as of polypropylene, to a predetermined shape. In addition, the core layer 2 is formed of an upper wall 21, a lower wall 22 and middle walls 23. The middle walls 23 are formed upright between the upper wall 21 and the lower wall 22 and form hexagonal-cylindrical sidewalls. The core layer 2 is sectioned to form cells S by the upper wall 21, the lower wall 22 and the middle walls 23, which are formed inside the core layer 2.

The cells S that are formed by sectioning the core layer 2, which includes first cells S1 and second cells S2 having different configurations. As shown in FIG. 4(b), the upper end of first cells S1 is closed by the upper wall 21 having a two-layer structure, and the lower end of first cells S1 is closed by the lower wall 22 having a one-layer structure. The layers of the upper wall 21 having this two-layer structure are joined to each other. In addition, an opening 24 is formed in the center portion of the upper wall 21 at the upper end of each first cell S1. The opening 24 is formed along one diagonal line that passes through the center of the end surface of each first cell S1 having a hexagonal shape, and the shape of the opening is made substantially elliptical (see FIG. 4(a)).

Meanwhile, as shown in FIG. 4(c), the upper end of the second cells S2 is closed by the upper wall 21 having a one-layer structure, and the lower end of the second cells S2 is closed by the lower wall 22 having a two-layer structure. The layers of the lower wall 22 having this two-layer structure are joined to each other. In addition, an opening 24, which is the same as the opening 24 provided in the first cells S1, is formed in the center portion of the lower wall 22 at the lower end of each second cell S2.

As shown in FIG. 4(a), the first cells S1 and the second cells S2 are aligned in such a manner that the first cells S1 and the second cells S2 are adjacent to each other in the X direction so as to make rows. In addition, the rows of the first cells S1 and the rows of the second cells S2 are aligned so as to be alternately arranged in the Y direction, which is perpendicular to the X direction.

As shown in FIGS. 4(b) and 4(c), adjacent first cells S1 and adjacent second cells S2 are defined by middle walls 23 having a two-layer structure that are formed so as to be perpendicular to the upper wall 21 and the lower wall 22. The middle walls 23 are formed so as to be perpendicular to the upper walls 21 and the lower walls 22, and therefore the structure is strong against force in the thickness direction of the structure 1. This increases the compressive strength. Furthermore, the middle walls 23 are formed to have a two-layer structure so that the strength of the structure 1 against compression is further increased. The layers of the middle walls 23 having this two-layer structure merely make contact with each other and can be separated from each other in the structure. Accordingly, the layers of the middle walls 23 are separated from each other throughout the entire area due to the internal pressure of cells S so that a communication portion 23a is formed between the layers when the internal pressure is increased (see the portions surrounded by the broken chain line in FIGS. 4(b) and 4(c)). This communication portion 23a connects first cells S1 or second cells S2 that are adjacent to each other in the Y direction. In the present embodiment, the entire area between the layers of the middle walls 23 is a non-adhesive portion.

Sheet-like skin layers 3 and 4 are joined to the upper and lower ends of the thus-formed core layer 2 through thermal fusion, and thus the structure 10 is formed. The skin layers 3 and 4 are made of a thermoplastic resin sheet, such as of polypropylene, and are joined to the upper surface of the upper wall 21 of the core layer 2 and the lower surface of the lower wall 22 of the core layer 2, respectively. It is preferable for the sheet for forming the skin layers 3 and 4 to be made of the same material as the sheet for forming the core layer 2 from the viewpoint of ease in joining the core layer 2 to the skin layers 3 and 4 through thermal fusion.

In addition, as shown in FIGS. 4(b) and 4(c), the upper surface of the structure 10 is formed of the upper wall 21 of the core layer 2 and the skin layer 3, and the lower surface of the structure 10 is formed of the lower wall 22 of the core layer 2 and the skin layer 4. Therefore, the upper surface of the structure 10 is provided with one-layer portions L1 formed of only the skin layer 3 corresponding to an opening 24, two-layer portions L2 formed of the upper wall 21 having a one-layer structure and the skin layer 3, and three-layer portions L3 formed of the upper wall 21 having a two-layer structure and the skin layer 3.

The one-layer portions L1, the two-layer portions L2, and the three-layer portions L3 are arranged regularly on the upper surface of the structure 1 corresponding to the arrangement of the first cells S1 and the second cells S2. Specifically, one-layer portions L1 and three-layer portions L3 are provided in the locations corresponding to the rows of first cells S1, and two-layer portions L2 are provided in locations corresponding to rows of second cells S2. In addition, three-layer portions L3 are arranged so as to surround one layer portions L1 so that one-layer portions L1 do not make contact with each other in the arrangement. When viewed cell by cell, one-layer portions L1 are provided in the locations corresponding to the center portions of the first cells S1 at the end surface, and three-layer portions L3 are provided in locations corresponding to the peripheral portions of the first cells S1 at the end surface.

In addition, one-layer portions L1, two-layer portions L2, and three-layer portions L3 are formed on the lower surface of the structure 10 in the same manner as on the upper surface. Furthermore, two-layer portions L2 are provided to the portions on the lower surface of the structure 10 where there are one-layer portions L1 and three-layer portions L3 on the upper surface, and one-layer portions L1 and three-layer portions L3 are provided to the portions on the lower surface of the structure 10 where there are two-layer portions L2 on the upper surface.

Figure 5:
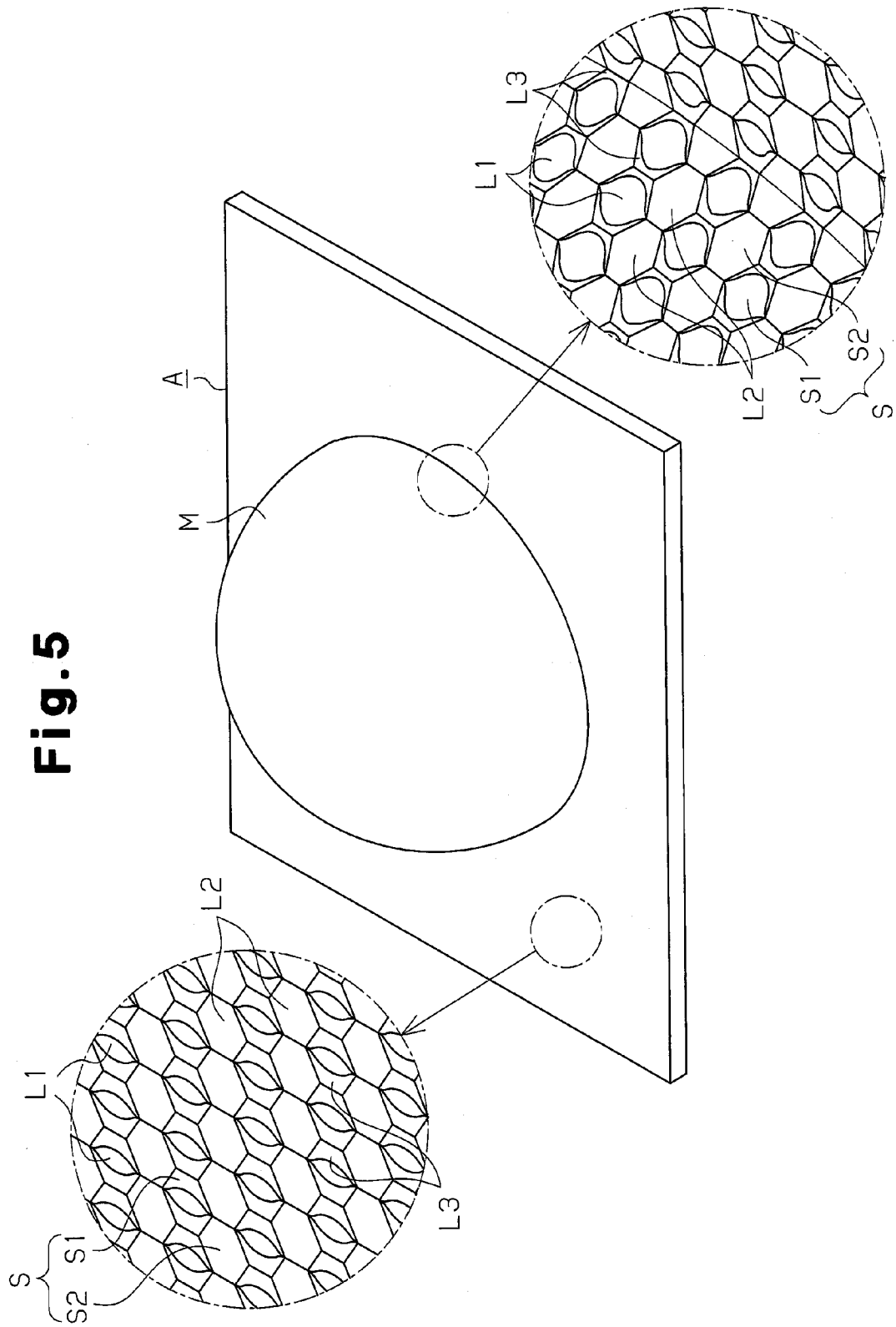
FIG. 5 is a perspective view showing a molded article obtained from a structure according to a third embodiment.

FIG. 5 shows a molded article A where a bent portion M is formed by applying a bending process to the above described structure 10. As shown in FIG. 5, on the surface of the bent portion M, the one-layer portions L1, the two-layer portions L2, and the three-layer portions L3 are deformed in such a manner that the degree of deformity reduces in this order, as compared with the surface of the flat portion. Specifically, the one-layer portions L1 and the two-layer portions L2 greatly allow for deformation and extend their areas greatly. Meanwhile, the three-layer portions L3 insignificantly extend their area and are collectively located in the periphery of the end surface of the cells S. The one-layer portions L1 and the two layer portions L2 that greatly allow for deformation are thus provided, and as a result the curved surface in the bent portion M is smoothed. In addition, the three-layer portions L3 are collected at the periphery on the end surface of the cells so that the skeleton of the cells is reinforced, which contributes to the maintenance of the cell structure. As a result, the bent portion M of the molded article A according to the present embodiment has a smooth curved surface of the structure, and increased strength.

In addition, the upper and lower surfaces of the structure 10 according to the present embodiment have the same structure, and thus the structure 10 has no directionality between the upper and lower surfaces. Therefore, a molded article A obtained from the structure 10 has substantially the same surface profile and strength on the convex surface side (outer surface side) and the concave surface side (inner surface side) in a bent portion M. Accordingly, the molded article A according to the present embodiment can be used as a molded article with the convex surface side of the bent portion M being the front surface or with the concave surface side of the bent portion M being the front surface. This is the same for molded articles obtained from the structures 1 according to the first and second embodiments.

Next, a manufacturing method for a molded article A according to the present embodiment is described.

The manufacturing method for a molded article A includes: the molding step for molding a plastic sheet into a sheet material 100; the folding step for forming a core layer 2 by folding the sheet material 100; the opening forming step for forming an opening 24 in the core layer 2; a joining step for forming a structure 10 by joining skin layers 3 and 4 to the upper and lower surfaces of the core layer 2; and the processing step for providing a bent portion M by applying a bending process to the structure 10.

Figure 6A:
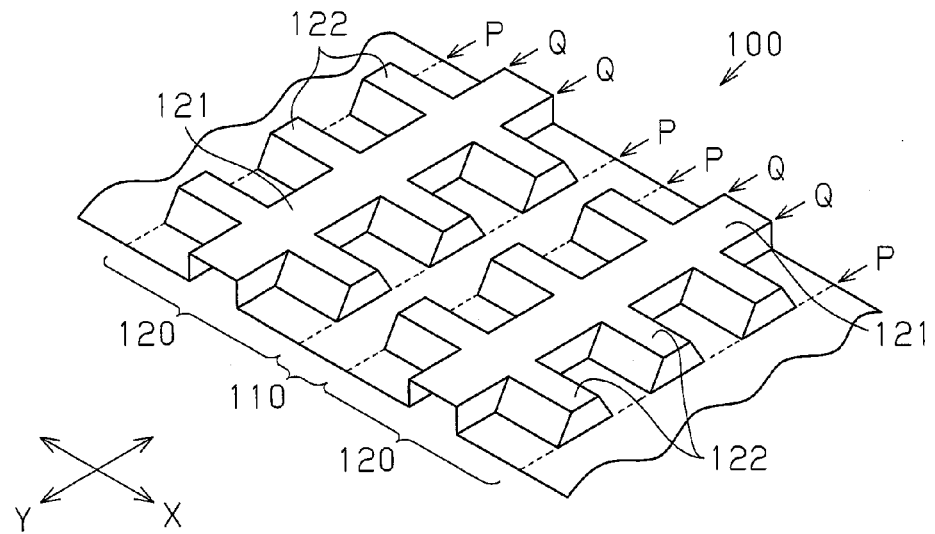
FIG. 6(a) is a perspective view showing a sheet material for forming the core layer of the structure according to the third embodiment.

In the molding step, one sheet made of a thermoplastic resin is molded into a predetermined shape by applying heat, and thus a sheet material 100 is formed. As shown in FIG. 6(a), band-shaped flat surface regions 110 and protruding regions 120 are provided so as to be alternately arranged in the widthwise direction (X direction). Groove-shaped first protruding portions 121 having an upper surface, a pair of side surfaces and an opening facing downwards are formed throughout the entirety of the protruding regions 120 in the direction in which the protruding regions 120 extend (Y direction). It is preferable for the angle between the upper surface and the side surfaces of the first protruding portions 121 to be 90 degrees, and the first protruding portions 121 are groove-shaped having openings facing downwards. In addition, the width of the first protruding portions 121 (the length of the upper surface in the latitudinal direction) is equal to the width of the flat surface regions 110 and two times greater than the height of the first protruding portions 121 (length of the side surfaces in the latitudinal direction).

In addition, a plurality of second protruding portions 122 of which the cross-section is in trapezoidal shape that is obtained by sectioning a regular hexagon into two along the longest diagonal line is formed in the protruding regions 120 so as to cross the first protruding portions 121 at a right angle. The height of the second protruding portions 122 is set to be the same as the height of the first protruding portions 121. In addition, the intervals between adjacent second protruding portions 122 are equal to the width of the upper surface of the second protruding portions 122.

The first protruding portions 121 and the second protruding portions 122 are formed by making a sheet partially protrude upwards using the plasticity of the sheet. In addition, the sheet material 100 can be molded from one sheet in accordance with a known molding method, such as a vacuum molding method or a compression molding method.

Figure 6B:
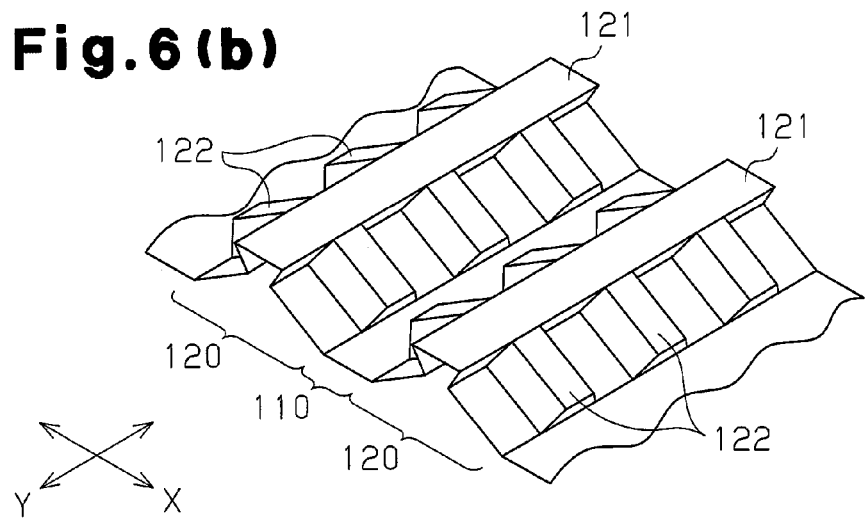
FIG. 6(b) is a perspective view showing the sheet material during folding.
Figure 6C:
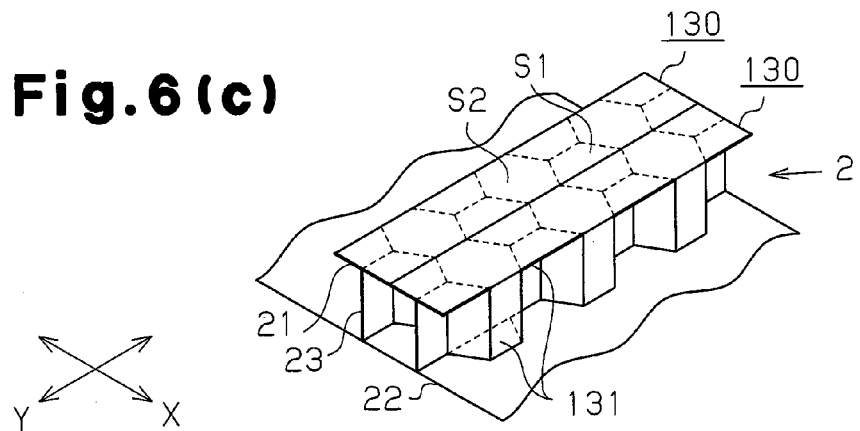
FIG. 6(c) is a perspective view showing the sheet material when folded.

As shown in FIGS. 6(a) and 6(b), in the folding step, the sheet material 100 is valley folded along the boundary line P between the flat surface regions 110 and the protruding regions 120, and mountain folded along the boundary line Q between the upper surface of the first protruding portions 121 and the side surfaces so that the sheet material 100 is compressed in the X direction. Thus, the upper surface and the side surfaces of the first protruding portions 121 layer on top of each other through folding, and the end surface and the flat surface regions 110 of the second protruding portions 122 layer on top of each other through folding so that one hollow prismatic columnar section 130 that extends in the Y direction is formed for one protruding region 120 (see FIG. 6(c)). Such sections 130 are formed so as to continue in the X direction, and thus a plate-shaped core layer 2 is formed.

The upper wall 21 of the core layer 2 is formed of the upper surface and the side surfaces of the first protruding portions 121, and the lower wall 22 of the core layer 2 is formed of the end surface and the flat surface regions 110 of the second protruding portions 122. In addition, middle walls 23 are formed by the upper surface and the side surfaces of the second protruding portions 122. Furthermore, the portions of the upper wall 21 where the upper surface and the side surfaces of the first protruding portions 121 layer on top of each other through folding so as to form a two-layer structure as well as the portions of the lower wall 22 where the end surface and the flat surface regions 110 of the second protruding portions 122 layer on top of each other through folding so as to form a two-layer structure are respective overlapping portions 131 (see FIG. 6(c)).

In addition, second cells S2 are defined by folding the second protruding portions 122. The second cells S2 have a hexagonal-columnar space inside. In addition, first cells S1 are formed between adjacent pairs of sections 130. The first cells S1 have a hexagonal-columnar space inside. In the present embodiment, the upper surface and the side surfaces of the second protruding portions 122 form the sidewalls of the second cells S2, and the side surfaces of the second protruding portions 122 and the flat portions located between the second protruding portions 122 in the protruding regions 120 form the sidewalls of the first cells S1. In addition, the portions through which the upper surfaces of the second protruding portions 122 make contact with each other and the portions through which the above described flat portions in the protruding regions 120 make contact with each other are middle walls 23 having a two-layer structure.

The upper end of the first cells S1 is closed by a pair of overlapping portions 131, and the lower end of the second cells S2 is closed by a pair of overlapping portions 131.

It is preferable for the sheet material 100 to be in a softened state through heat treatment when the above described folding step is carried out, but it is also possible to carry out the folding step without heat treatment.

In the opening forming step, the upper and lower surfaces of the core layer 2 are heated at a predetermined temperature in such a state that the core layer 2 is maintained as being folded. In addition, pressure is applied to the core layer 2 in the thickness direction (upper and lower directions in FIGS. 4(b) and 4(c)) by means of a belt conveyor or the like, and thus the overlapping portions 131 having a two-layer structure are joined through thermal fusion. The overlapping portions 131 thermally contract, and thus a gap is formed as an opening 24 between a pair of overlapping portions 131, which defines the upper surface into upper ends of first cells S1 and defines the lower surface into lower ends of second cells S2 (see FIG. 4).

In the case where heat treatment is applied to the sheet material 100 in the folding step, it is preferable for the heat treatment in the opening forming step to be carried out at a temperature higher than the temperature during heat treatment in the folding step in order to make the formation of openings 24 easier. In addition, the heat treatment is applied under such conditions that the middle walls 23 having a two-layer structure are not joined through thermal fusion when the overlapping portions 131 contract.

In the joining step, skin layers 3 and 4 are respectively joined to the upper and lower surfaces of the core layer 2 that have been obtained through the opening forming step so that the structure 10 shown in FIG. 4 is obtained. In the present embodiment, sheets made of the same thermoplastic resin as that for forming the core layer 2 are used as the skin layers 3 and 4. The skin layers 3 and 4 are joined to the core layer 2 through thermal fusion.

In the case where the sheets for forming the skin layers 3 and 4 and the sheet material 100 for forming the core layer 2 are made of the same material, the skin layers 3 and 4 and the core layer 2 can be joined through thermal fusion. Therefore, the joining step can be carried out more easily than in the case where the skin layers 3 and 4 and the core layer 2 is joined using an adhesive.

In the following processing step, heat treatment is applied to the structure 10, which is thus converted to a softened state, and a bending process, such as a pressing process, is applied so as to form a bent portion M, and thus a molded article A is obtained. This processing step is the same as that in the first embodiment.

Figure 7:
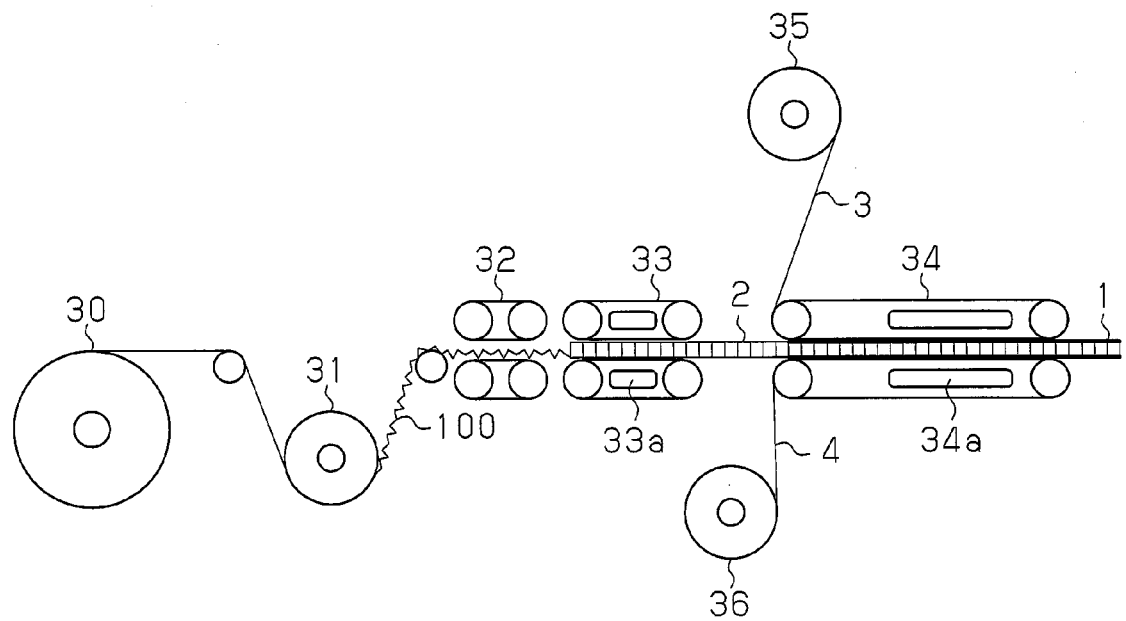
FIG. 7 is a schematic diagram showing an example of a manufacturing apparatus for manufacturing the structure according to the third embodiment.

FIG. 7 schematically shows an apparatus for continuously manufacturing the structure 10. In the apparatus shown in FIG. 7, the upstream side is on the left and the downstream side is on the right. In the sheet roll 30 provided on the upstream side, a sheet made of a thermoplastic resin that is the raw material of the core layer 2 is wound. A drum 31 for vacuum molding is provided on the downstream side of the sheet roll 30. This drum 31 for vacuum molding is rotatably supported around an axis when driven, and has such a structure as to be heated to a predetermined temperature. Furthermore, a circular-cylindrical molding die is attached to the outer periphery of the drum 31 for vacuum molding so that evacuation can be carried out via through holes formed in the molding die in the structure (not shown). The same uneven pattern as that made of flat surface regions 110 and protruding regions 120 on the sheet material 100 is formed on the outer peripheral surface of the molding die so that the outer surface of the die engages with the sheet material 100 with respect to the X direction.

First conveyors 32 and second conveyors 33 that respectively form upper and lower pairs are provided in this order on the downstream side of the drum 31 for vacuum molding. The conveying speed of the second conveyors 33 is set to be lower than the conveying speed of the first conveyors 32. In addition, the second conveyors 33 are provided with heating apparatuses 33a for heating the space between the second conveyors 33 to a predetermined temperature.

In addition, third conveyors 34 that form an upper and lower pair are provided on the downstream side of the second conveyors 33. The third conveyors 34 are provided with heating apparatuses 34a for heating the space between the third conveyors 34 to a predetermined temperature. The conveying speed of the third conveyors 34 is set to be equal to the conveying speed of the second conveyors 33. In addition, sheet rolls 35 and 36 where sheets made of a thermoplastic resin that is the raw material for the skin layers 3 and 4 are wound are provided to the vicinity of the respective inlets of the third conveyors 34.

Next, an aspect in which the structure 10 is formed by the apparatus shown in FIG. 7 is described. First, a sheet is fed out from the sheet roll 30 so as to be fed into the drum 31 for vacuum molding. Then, a predetermined uneven pattern is formed in the sheet by means of the drum 31 for vacuum molding so that a sheet material 100 is molded (molding step). The molded sheet material 100 is conveyed towards the downstream side in such a state that the movement in the upper and lower direction is regulated by the first conveyors 32 and the second conveyors 33. At this time, the conveying speed of the second conveyors 33 is set to be lower than the conveying speed of the first conveyors 32, and therefore the sheet material 100 is compressed in the downstream direction so as to be folded when conveyed from the first conveyors 32 to the second conveyors 33, and thus a core layer 2 is formed (folding step).

The thus-formed core layer 2 is heated by the heating apparatuses 33a in the second conveyors 33, and pressed by the second conveyors 33. As a result, the overlapping portions 131 in the core layer 2 are joined through thermal fusion and contract so that openings 24 are formed in the core layer 2 (opening forming step). Then, the core layer 2 is conveyed to the third conveyors 34. When the core layer 2 is conveyed to the third conveyors 34, skin layers 3 and 4 that have been fed from the sheet rolls 35 and 36 are inserted between the upper surface of the core layer 2 and one third conveyor 34 as well as between the lower surface of the core layer 2 and the other third conveyor 34. Then, the skin layers 3 and 4 as well as the upper and lower surfaces of the core layer 2 are heated by the heating apparatuses 34a in the third conveyors 34. With this heating, the skin layers 3 and 4 are joined to the upper and lower surfaces of the core layer 2 through thermal fusion so that a structure 10 is obtained (joining step).

As described above, the plate-shaped structure 10 can be continuously manufactured. In addition, the structure 10 carried out from the third conveyors 34 is cut into pieces having a size appropriate for application, which undergoes a bending process for forming a bent portion M so as to be converted to a molded article A.

In the third embodiment as well, the above described advantages (1) to (3) can be obtained. In addition, in the third embodiment, the following advantages can be obtained.

(4) The molded article A according to the present embodiment is formed by providing a bent portion M through a bending process to the structure 1 having a core layer 2 and skin layers 3 and 4 provided on the upper and lower surfaces of the core layer 2. The core layer 2 is made of a sheet material formed of a single plastic sheet. The core layer 2 is formed by folding the sheet material in such a manner that a plurality of cells S that are formed by sectioning the core layer 2 by the walls into hollow hexagonal columns disposed adjoiningly.

Since the skin layers 3 and 4 are provided on the upper and lower surfaces of the core layer 2, the strength is increased in comparison with a molded article that is obtained by providing a bent portion M through a bending process to a structure made of only a core layer 2. In addition, it is difficult to separate joining portions in the core layer 2 (in particular, joining portions between sections 130) due to the skin layers 3 and 4 on the upper and lower surfaces of the core layer 2 in the case where bending stress is applied in such a direction as to separate the joining portion during the bending process. Thus, the molded article can be prevented from cracking on the surface due to the separation of a joining portion.

(5) In the core layer 2, the upper end of the first cells 51 is closed by the upper wall 21 having a two-layer structure, and the lower end of the first cells 51 is closed by the lower wall 22 having a one-layer structure and openings 24 are formed in the upper walls 21 having a two-layer structure. Meanwhile, the upper end of the second cells S2 is closed by the upper wall 21 having a one-layer structure, and the lower end of the second cells S2 is closed by the lower wall 22 having a two-layer structure, and openings 24 are formed in the lower walls 22 having a two-layer structure.

As a result, for each of the cells, one-layer portions L1 corresponding to openings 24, two-layer portions L2 corresponding to the upper or lower wall having a one-layer structure, and three-layer portions L3 corresponding to the upper or lower wall having a two-layer structure, where a skin layer 3 or 4 is always included in each portion, are respectively provided to the upper and lower surfaces of the structure 10. In the molded article A that is obtained by providing a bent portion M through a bending process to this structure 10, the one-layer portions L1 greatly extend, allowing deformation to occur, while the three-layer portions L3 do not allow deformation to occur and function to maintain the structure of the cells S. In addition, the two-layer portions L2 serve as a midway arrangement between the one-layer portions L1 and the three-layer portions L3.

Thus, a portion which easily allows deformation to occur and a portion which maintains the cell structure without allowing deformation to occur are provided to each cell of the structure 10 so that the cell structure can be maintained, even in a bent portion M that is obtained by changing the shape of the structure in a molded article obtained from the structure 10. The cell structure in each cell S is maintained in a bent portion M so that a curved surface in the bent portion M can be made smooth, and the strength of the bent portion M can be increased.

(6) The manufacturing method for a molded article according to the present embodiment is provided with an opening forming step for forming an opening 24 between a pair of overlapping portions 131 on one end surface of a cell S that is closed by a pair of overlapping portions 131. With the opening forming step, a one-layer portions L1 corresponding to an opening 24, in addition to a two-layer portion L2 and a three-layer portion L3, are formed on the upper and lower surface in each cell of the structure 1. In a molded article A that is obtained by providing a bent portion M for the structure 1 having one-layer portions L1, two-layer portions L2 and three-layer portions L3, the cell structure can be easily maintained even in bent portions M, and therefore the curved surface in the bent portions M is smoothed and as a whole the strength is increased.

(7) In the opening forming step in the manufacturing method for a molded article according to the present embodiment, the core layer 2 is heated so that pairs of overlapping portions 131 are thermally contracted, and thus openings 24 are formed. In this configuration, openings 24 can be formed simultaneously in a plurality of cells S and for a short period of time.

In addition, in the present embodiment, a one-layer portion L1 that can deform greatly and a three-layer portion L3 that insignificantly deforms are provided in each cell, and the three-layer portions L3 are provided so as to virtually surround the one-layer portions L1. As a result, unintended protruding portions and wrinkles can be prevented from being formed in extended bent portions M, and reduction in the strength of the bent portions M can be prevented. In addition, two-layer portions L2 are located adjacent to the three-layer portions L3 so that the reduction in the strength of the bent portions M can further be prevented.

It is possible to modify each of the above described embodiments by applying a modification as follows. It is also possible to combine the following modifications and modify the above described embodiments so that the structures of these combinations can be provided.

In the structure 1 according to the first embodiment and its molded article, the sheets for forming the core layer 2 and the skin layers 3 and 4 may be made of any material as long as it has plasticity. The sheets may be, for example, made of a fiber bonding material, a material made of paper or a material made of metal. In addition, the core layer 2 and the skin layers 3 and 4 may be formed of sheets made of different materials.

Furthermore, in some cases, sheets having a molecular orientation as that in stretched sheets made of a synthetic resin are used as the sheets for forming the skin layers 3 and 4. In these cases, it is preferable for the sheets to be formed in such a manner that the orientation direction of the sheets in the skin layers 3 and 4 and the direction in which the bent sheet 2*b* in the core layer 2 extends (Y direction) are different. In the case where the sheets are formed in this manner, the strength of the structure against bending in the X direction is increased in comparison with the case where the above described two directions are the same.

This also applies to the second and third embodiments. In the second and third embodiments, it is preferable for the structure to be formed in such a manner that the direction in which the band—shaped sheets 2*a* extend and the direction in which the sections 130 extend are respectively different from the orientation direction of the sheets in the skin layers 3 and 4.

Although the core layer 2 and the skin layers 3 and 4 are single layers in the structure 1 according to the first embodiment and its molded article, it is possible for each layer to have multiple layers in the structure. For example, skin layers 3 and 4, each of which are double-layered, may be provided on the upper and lower surfaces of the core layer 2 having a single layer structure. In the case where a multilayer structure is formed by layering core layers 2 on top of each other, the core layers 2 may be directly layered on top of each other or the core layers 2 may be layered on top of each other with a sheet-like middle layer in between. In the latter case, the core layers 2 can be joined to each other more firmly. These points also apply to the second and third embodiments.

Although the core layer 2 is sectioned to form hollow hexagonal-columnar cells S that are formed inside the core layer 2 in the structure 1 according to the first embodiment and its molded article, the shape of the cells S is not particularly limited and they may have a shape of a hollow polygonal column, such as a hollow square column or a hollow octagonal column, or a hollow cylindrical column. At this time, the structure may allow cells to have different forms. This also applies to the second and third embodiments.

Figure 1:
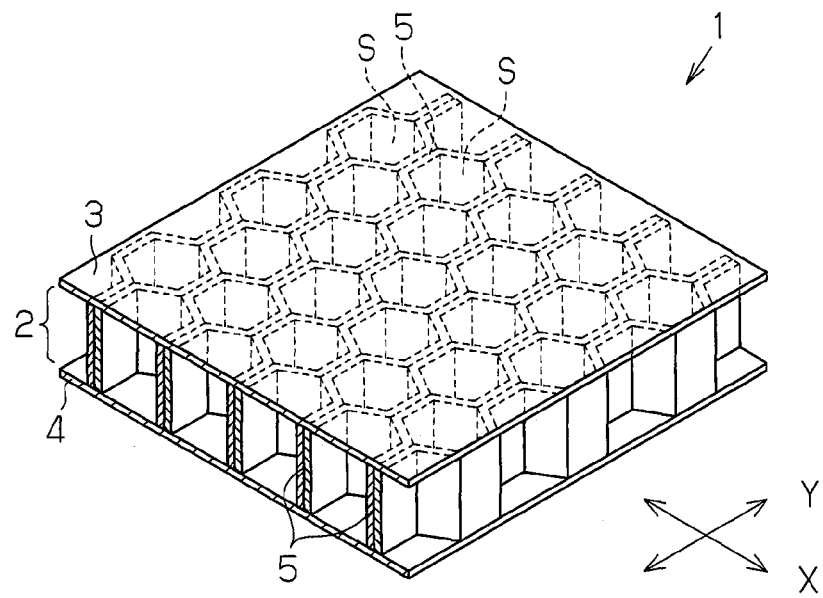
FIG. 1(a) is a perspective view showing a structure according to a first embodiment of the present invention.
FIG. 1(b) is a partially enlarged view showing a communication portion of the structure according to the first embodiment.
FIG. 1(c) is a partially enlarged view showing a communication portion of a structure according to a second embodiment of the present invention.
Figure 1:
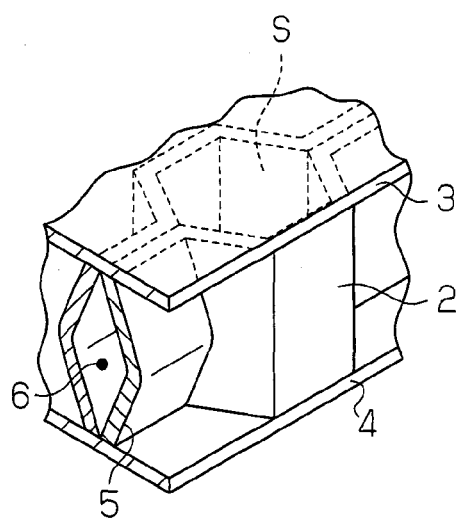
Figure 1:
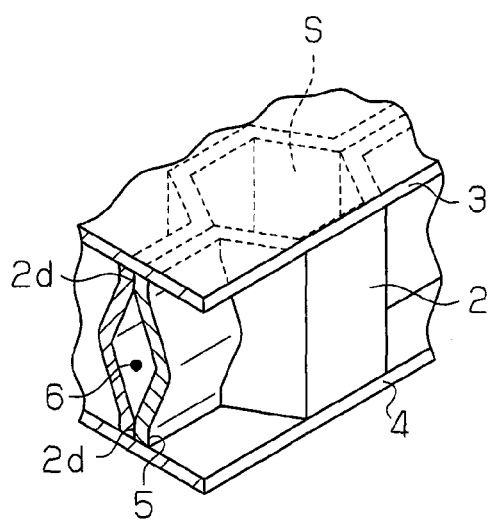

Although the communication portions 6 are provided so as to communicate with adjacent cells S in the Y direction in FIG. 1 in the structure 1 according to the first embodiment and its molded article, the communication portions 6 may be provided so as to communicate with adjacent cells S through any portion. For example, communication portions for communicating with adjacent cells S may be provided between cells S adjacent to each other in the X direction. In addition, communication portions 6 may be provided to communicate with only certain cells S instead of communicating with all the cells S. This also applies to the second and third embodiments.

In the structure 1 according to the first embodiment and its molded article, adhesive portions 2d for adhering each layer together may be provided between the layers of the middle walls 5 in the thickness direction of the core layer 2. This structure can be made by heating the core layer 2 to such an extent that the two end portions of the middle walls 5 are softened during heat treatment in the joining step for joining the skin layers 3 and 4 to the core layer 2, for example. This also applies to the third embodiment.

In the structure 1 according to the first embodiment and its molded article, a plurality of communication portions 6 may be formed between the layers of the middle walls 5 in the structure. In the case where adhesive portions are provided in center portions between the layers of the middle walls 5 in the thickness direction of the core layer 2, for example, the middle walls 5 can provide two communication portions 6 that are disposed adjoiningly in the thickness direction of the core layer 2 in the structure. This also applies to the second and third embodiments.

Although the structure allows layers in the middle walls 5 having two layers to be spaced from each other so as to form a communication portion 6 when the internal pressure of cells S increases in the structure 1 according to the first embodiment and its molded article, a groove or a gap may be provided between the layers of the middle walls 5 as a communication portion 6 so that cells S are always communicated with in the structure. This also applies to the second and third embodiments.

Although the middle walls 5 are formed so as to have a two-layer structure in the structure 1 according to the first embodiment and its molded article, they may be formed so as to have a multilayer structure with three or more layers. In the case where the core layer 2 is formed of bent sheets 2b in such a state that two sheets are layered on top of each other, for example, the middle walls 5 have a four-layer structure. This also applies to the second and third embodiments.

Although the core layer 2 and the skin layers 3 and 4 are joined to each other through thermal fusion in the structure 1 according to the first embodiment, they may be joined using other means, such as an adhesive. In the case where they are joined using an adhesive, it is preferable to use an adhesive of which the temperature for liquefaction is higher than the temperature at which the sheets for forming the core layer 2 and the skin layers 3 and 4 soften in order to prevent the adhesive from liquefying to cause the joined portion to separate when heat treatment is applied to the structure 1 in the processing step for forming a molded article. This also applies to the second and third embodiments. In addition, in the second and third embodiments, the joined portions in the core layer 2 may be joined using an adhesive.

Although only a bent portion M that bulges in the upward direction from the plane of the structure 10 is formed in the molded article A according to the third embodiment shown in FIG. 5, a bent portion M that bulges in the upward direction and a bent portion M that bulges in the downward direction may both be provided in the molded article A. This also applies to the molded articles in the first and second embodiments.

The shape of openings 24 is not particularly limited and may be any form, such as a circular or polygonal shape.

Although in the molded articles according to the present embodiments communication portions 23a are provided so as to communicate between first cells S1 and second cells S2 that are adjacent to each other in the Y direction in FIG. 2, they may be partially provided to communicate only with cells S that are adjacent to each other in any direction. That is to say, communication portions 23a may be provided to communicate with first cells S1 (second cells S2) that are adjacent to each other in the X direction or to connect the first cells S1 to the second cells S2. In addition, communication portions 23a may be provided to communicate with certain cells S instead of providing communication portions 23a to communicate with all the cells S in the configuration. In this case, it is preferable to provide communication portions 23a to at least portions to which bending stress is applied (cells S located in the bent portion M and its periphery). Furthermore, the structure may have no communication portions 23a provided.

Although openings 24 are formed between pairs of overlapping portions 131 by allowing the pairs of overlapping portions 131 to thermally contract during heat treatment in the opening forming step in the manufacturing method for a molded article according to the present embodiments, the opening forming step is not limited to this. For example, openings 24 may be pierced between pairs of overlapping portions 131 in the opening forming step.

Although the opening forming step and the joining step are different steps in the manufacturing method for a molded article according to the present embodiments, they may be carried out simultaneously. That is to say, the formation of openings 24 between pairs of overlapping portions 131 through thermal contraction and thermal fusion of the skin layers 3 and 4 to the core layer 2 may be carried out simultaneously during one heat treatment.

The invention claimed is:

1. A structure comprising:
a core layer in which a plurality of cells are defined by sidewalls having a polygonal or circular cross-section; and
skin layers provided on the upper and lower surfaces of the core layer,
wherein communication portions for connecting adjacent cells to each other are formed in the core layer,
wherein the core layer is provided with middle walls having a multilayer structure formed of the sidewalls of adjacent cells in which the sidewalls are layered together in a direction perpendicular to the direction in which the communication portions communicate with cells,
wherein the sidewalls of the adjacent cells are in direct contact with one another, and
wherein the communication portions are formed between layers in the middle walls.

2. The structure according to claim 1, wherein
the communication portions are formed as a non-adhesive portion provided between layers in the middle walls.

3. The structure according to claim 2, wherein between the layers in the middle walls, the non-adhesive portion is provided at the center in the thickness direction of the core layer, and adhesive portions, through which the layers are adhered to each other, are provided at the two end portions in the thickness direction of the core layer.

4. The structure according to claim 1, wherein the core layer includes a plurality of sheet strips formed by forming a band-shaped plastic sheet into a predetermined shape, and the core layer is formed by adjoiningly disposing the sheet strips so that a plurality of cells having a polygonal or circular cross-section are disposed adjoiningly between the sheet strips.

5. The structure according to claim 1, wherein the core layer is formed by folding a sheet material molded of a single plastic sheet into a predetermined shape such that a plurality of cells that are formed by the sidewalls having a polygonal or circular cross-section are defined to be disposed adjoiningly in the core layer.

6. The structure according to claim 1, wherein the core layer is formed of a sheet material that is molded of a single sheet and has band-shaped flat surface regions and protruding regions alternately arranged in the widthwise direction, the sheet material having first protruding portions and a plurality of second protruding portions, the first protruding portions extending in the protruding regions and along the direction perpendicular to the widthwise direction and having a groove-shaped cross-section opening downwards, and the second protruding portions being formed to cross the first protruding portions, extending in the widthwise direction, and having a cross-section in polygonal or semicircular shape, and wherein the core layer is formed by valley folding the sheet material along the boundary line between the flat surface regions and the protruding regions and by mountain folding the sheet material along the boundary line between the upper surface and the side surface of the first protruding portion in the protruding regions.

7. A molded article formed by providing a bent portion to the structure according to claim 1 through a bending process.

8. A manufacturing method for a molded article, comprising:
    a molding step for molding a single plastic sheet into single sheet material in which band-shaped flat surface regions and protruding regions are alternately arranged in the widthwise direction, the sheet material having first protruding portions and a plurality of second protruding portions, the first protruding portions extending in the protruding regions in the direction perpendicular to the widthwise direction and having a groove-shaped cross-section opening downwards, and the second protruding portions being formed so as to cross the first protruding portions, extending in the widthwise direction, and having a cross-section in polygonal or semicircular shape;
    a folding step for forming a core layer in which a plurality of cylindrical cells are formed upright by sectioning the core layer with the second protruding portions by valley folding the sheet material along the boundary line between the flat surface regions and the protruding regions and by mountain folding the sheet material along the boundary line between the upper surface and the side surface of the first protruding portion in the protruding regions;
    an opening forming step for forming an opening through a pair of overlapping portions in one end surface of each cell that is closed by the pair of overlapping portions formed of the flat surface regions and end surfaces of the second protruding portions;
    a joining step for forming a structure by joining skin layers to the upper and lower surfaces of the core layer; and
    a processing step for forming a bent portion by applying a bending process to the structure,
    wherein the opening forming step is a step for forming an opening by heating the core layer so that the pair of overlapping portions are thermally contracted.

9. A molded article manufactured in accordance with the method according to claim 8.

10. The molded article according to claim 9, wherein the core layer has a plurality of cylindrical cells that are formed by sectioning the core layer with the second protruding portions, one end of each cell is closed by a pair of overlapping portions that are formed of the flat surface regions and end surfaces of the second protruding portions, and the other end is closed by upper surfaces of the first protruding portions, and the opening is formed in a pair of overlapping portions on one end surface of the cells.

11. A manufacturing method for a structure, comprising:
    a molding step for molding a single plastic sheet into single sheet material in which band-shaped flat surface regions and protruding regions are alternately arranged in the widthwise direction, the sheet material having first protruding portions and a plurality of second protruding portions, the first protruding portions extending in the protruding regions in the direction perpendicular to the widthwise direction and having a groove-shaped cross-section opening downwards, and the second protruding portions being formed so as to cross the first protruding portions, extending in the widthwise direction, and having a cross-section in polygonal or semicircular shape;
    a folding step for forming a core layer in which a plurality of cylindrical cells are formed upright by sectioning the core layer with the second protruding portions by valley folding the sheet material along the boundary line between the flat surface regions and the protruding regions and by mountain folding the sheet material along the boundary line between the upper surface and the side surface of the first protruding portion in the protruding regions;
    an opening forming step for forming an opening through a pair of overlapping portions in one end surface of each cell that is closed by the pair of overlapping portions formed of the flat surface regions and end surfaces of the second protruding portions; and
    a joining step for forming a structure by joining skin layers to the upper and lower surfaces of the core layer,
    wherein the opening forming step is a step for forming an opening by heating the core layer so that the pair of overlapping portions are thermally contracted.

* * * * *